United States Patent [19]

Iwata

[11] Patent Number: 5,062,294
[45] Date of Patent: Nov. 5, 1991

[54] APPARATUS FOR DETECTING PRESSURE IN CYLINDER OF INTERNAL COMBUSTION ENGINE

[75] Inventor: Toshio Iwata, Hyogo, Japan

[73] Assignee: Mitsubishi Denki K.K., Tokyo, Japan

[21] Appl. No.: 503,072

[22] Filed: Mar. 29, 1990

Related U.S. Application Data

[63] Continuation of Ser. No. 311,787, Feb. 17, 1989, abandoned.

[30] Foreign Application Priority Data

Feb. 22, 1988 [JP] Japan ................. 63-39906
Feb. 22, 1988 [JP] Japan ................. 63-39907
Feb. 22, 1988 [JP] Japan ................. 63-39909
Feb. 22, 1988 [JP] Japan ................. 63-39910
Mar. 18, 1988 [JP] Japan ................. 63-35162[U]

[51] Int. Cl.5 .................................... G01M 15/00
[52] U.S. Cl. .................................... 73/115
[58] Field of Search ............. 73/35, 115, 117.3, 708, 73/DIG. 4, 766; 310/315, 346, 338

[56] References Cited

U.S. PATENT DOCUMENTS

| 4,192,005 | 3/1980 | Kurtz ............... | 73/766 |
| 4,567,751 | 2/1986 | Ootsuka et al. ........ | 73/35 |
| 4,612,895 | 9/1986 | Kuroiwa et al. ........ | 73/861.02 |
| 4,750,103 | 6/1988 | Abo et al. ............ | 73/35 |
| 4,821,194 | 4/1989 | Kawamura ............. | 73/35 |

FOREIGN PATENT DOCUMENTS

| 2523694 | 4/1985 | Fed. Rep. of Germany . | |
| 3523230 | 1/1986 | Fed. Rep. of Germany . | |
| 3503489 | 7/1986 | Fed. Rep. of Germany | 73/708 |
| 3704837 | 8/1987 | Fed. Rep. of Germany . | |
| 144606 | 10/1980 | German Democratic Rep. . | |
| 91232 | 6/1987 | Japan . | |
| 0291535 | 12/1987 | Japan ........... | 73/35 |

OTHER PUBLICATIONS

Dubendorfer et al., "State-of-the-Art Pressure Measurements in Combustion Engines", ISA Transactions, vol. 24, No. 2, 1985.
"Ladungsverstartker fur Piezoelektrische Aufnehmer mit MOS-Transistoreingang", by Dipl.-Ing. E. Nier, 1971.

Primary Examiner—Robert Raevis
Attorney, Agent, or Firm—Sughrue, Mion, Zinn, Macpeak & Seas

[57] ABSTRACT

An apparatus for detecting the pressure in a cylinder of an internal combustion engine is disclosed which includes a piezoelectric pressure sensor and a current input circuit. The sensor detects the pressure in the cylinder. A current input circuit receives the output signal of the sensor in the form of a current and generates an output corresponding to the value of the current in the form of a voltage or current.

9 Claims, 5 Drawing Sheets

APPARATUS FOR DETECTING PRESSURE IN CYLINDER OF INTERNAL COMBUSTION ENGINE

This is a continuation of application Ser. No. 07/311,787 filed Feb. 17, 1989, and now abandoned.

BACKGROUND OF THE INVENTION

1. Field of the Invention

The present invention relates to an apparatus for detecting pressure in a cylinder of an internal combustion engine, which is used to measure information on the pressure in the combustion cylinder of an internal combustion engine.

2. Description of Related Background Art

Figure 1:
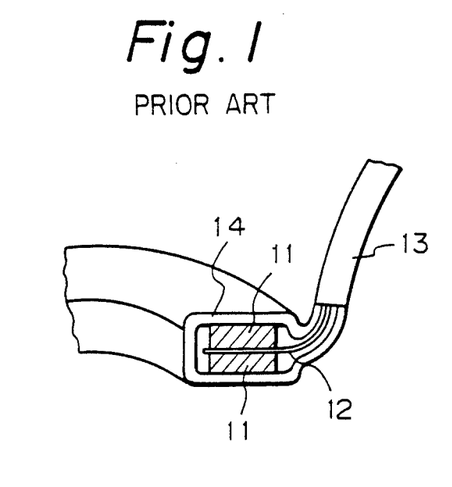
FIG. 1 is a cross-sectional view of a piezoelectric cylinder pressure sensor.
Figure 2:
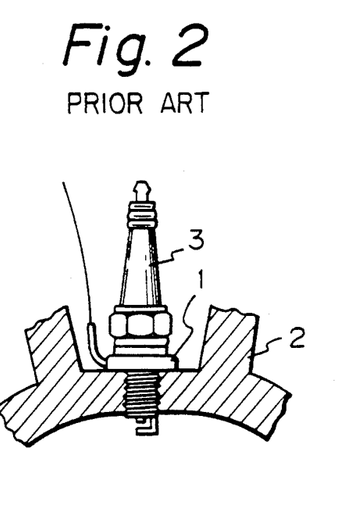
FIG. 2 is a diagram showing the manner of attaching a piezoelectric cylinder pressure sensor.

In general, the pressure in a combustion cylinder is measured in order to determine the state of combustion of an internal combustion engine and the operation of each cycle of rotation. A piezoelectric cylinder pressure sensor is ordinarily used as a cylinder pressure sensor in such a pressure measurement. In such a sensor, the pressure in the cylinder is directly or indirectly applied to a piezoelectric element which generates electric charges in response to the pressure, and a charge amount corresponding to the applied pressure is then output. FIG. 1 shows an example of a piezoelectric cylinder pressure sensor. In the diagram, reference numeral 11 denotes piezoelectric elements; 12 indicates an electrode which is sandwiched between the two piezoelectric elements 11 and leads an output signal to a lead wire 13; and 14 is a casing which covers the internal structural parts of the sensor. The sensor has a ring-like shape and is placed between a cylinder head 2 forming an upper wall of a combustion cylinder of an engine and a spark plug 3, as shown in FIG. 2. The pressure in the combustion cylinder is propagated through the spark plug to the piezoelectric elements 11 of a piezoelectric cylinder pressure sensor 1, whereby charges corresponding to the cylinder pressure are generated.

Figure 3:
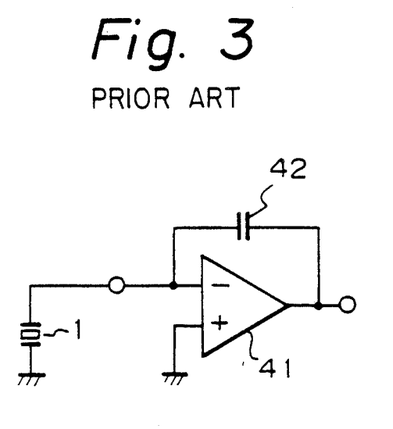
FIG. 3 is a circuit diagram of a conventional apparatus.

Since an output signal corresponding to the cylinder pressure of the sensor represents a charge amount, the charge amount needs to be converted into the value of a voltage which can readily be electrically processed. For this purpose, hitherto, a charging amplifier has generally been used as means for converting the charge amount into the voltage value. FIG. 3 shows a fundamental circuit diagram of a charging amplifier. In FIG. 3, reference numeral 41 denotes an operational amplifier and 42 is a capacitor. An output of the sensor 1 is input to an inverting input terminal of the operational amplifier 41. The capacitor 42 is connected between the inverting input terminal of the operational amplifier 41 and an output terminal thereof. A non-inverting input terminal of the operational amplifier 41 is connected to the ground. The output of the operational amplifier 41 is controlled so as to equalize the levels of the voltages at the inverting and non-inverting input terminals. Accordingly, when an electric charge value Q from the sensor 1 is input to the operational amplifier 41, the amplifier operates to charge the capacitor 42 with the same amount as the charge value Q.

Figure 4:
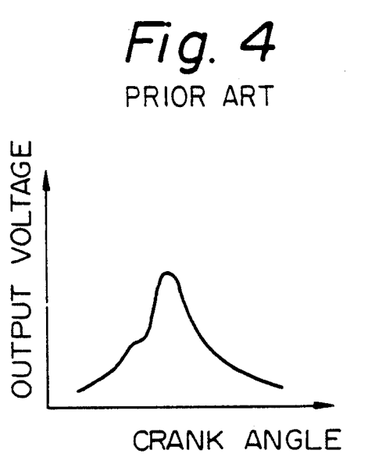
FIG. 4 is an explanatory diagram showing the relationship between a crank angle and an output voltage in the conventional apparatus shown in FIG. 3 during operation.

Therefore, assuming that the electrostatic capacity of the capacitor 42 is set at C, the voltage of $V = Q/C$ is output from the operational amplifier 41. Since the charge amount Q is proportional to the cylinder pressure, the output voltage V of the operational amplifier 41 has a value corresponding to the pressure in the cylinder. During the operation of the engine, a combustion pressure signal as shown in FIG. 4 is output.

However, since the foregoing charging amplifier is of the type in which the charge amount is directly converted into the voltage value by the capacitor and the electrostatic capacity of the capacitor 42 is set to a small value in accordance with the electrostatic capacity of the piezoelectric elements 11 of the sensor 1, the following problem is encountered. If charges other than the cylinder pressure signal move, that is, if leakage currents flow through the sensor 1, the output signal line thereof, the input section of the charging amplifier, or the like, or if an input bias current flows through the operational amplifier 41 or the like, the output voltage of operational amplifier 41 fluctuates and hence the cylinder pressure cannot be accurately measured.

Further, the pressure/charge amount converting characteristics in the sensor 1 vary in accordance with temperature changes, and so-called pyro effect acts to cause charges to be generated in accordance with changes in the temperature of the piezoelectric element. In particular, when the sensor is attached near the combustion chamber as shown in FIG. 2, a problem is encountered in that the temperature change which occurs each cycle due to increases in the temperature of the cylinder head 2 or spark plug 3 or any temperature transfer in the combustion chamber is large. This means the output signal waveform of the charging amplifier is greatly influenced by such temperature changes and the cylinder pressure cannot be accurately measured. An additional problem is that, even if attempts are made to provide for temperature compensation by certain means, the construction of such means will inevitably be complicated because the output charge amount in the circuit of the charging amplifier is directly converted into the voltage value by the capacitor 42.

There is still another problem in that although the output voltage of the charging amplifier 41 changes in accordance with variations in cylinder pressure, it cannot represent the absolute pressure value of the pressure in the cylinder.

SUMMARY OF THE INVENTION

The present invention was conceived in consideration of the foregoing problems and it is the first object of the invention to realize accurate measurement which is not influenced by leakage currents in the conversion of an output signal of a piezoelectric cylinder pressure sensor into a voltage value.

The second object of the invention is to realize accurate measurement of pressure in a cylinder which is not influenced by changes in temperature of a cylinder pressure sensor when a signal corresponding to the cylinder pressure is obtained from an output signal of a piezoelectric cylinder pressure sensor.

The third object of the invention is to enable generation of a signal corresponding to the absolute value of the pressure in a cylinder by utilizing an output signal of a cylinder pressure sensor.

The fourth object of the invention is to provide a cylinder pressure detecting apparatus which can detect any failure of a cylinder pressure sensor in which the occurrence of such a failure is discerned by checking whether or not a cylinder pressure signal from a piezoelectric cylinder pressure sensor exceeds a predetermined reference level.

To accomplish the above objects, the present invention incorporates the following features.

In an apparatus for detecting pressure in a cylinder of an internal combustion engine according to the present invention, an output signal of a piezoelectric pressure sensor is received in the form of a current and converted into a voltage value or a current value in a current input circuit. Thereafter, it is integrated by an integrator to thereby obtain a cylinder pressure signal. Since the integrator is connected through the current input circuit to the sensor, the integrator can be constructed without taking into account the electrostatic capacity of a piezoelectric element. Thus, a cylinder pressure signal which is not influenced by leakage current can be output.

According to the invention, the cylinder pressure detecting apparatus is provided with a temperature sensor for measuring the temperature of a cylinder pressure sensor. An output signal from a cylinder pressure signal output circuit is obtained from an output signal of the cylinder pressure sensor and corresponds to the pressure in the relevant cylinder. The output signal is corrected on the basis of an output value of the temperature sensor, and the cylinder pressure signal can thus be corrected to allow for any temperature change.

According to the present invention, in the cylinder pressure detecting apparatus, an output signal of the piezoelectric pressure sensor is received in the form of a current and converted into a voltage value or a current value and, thereafter, it is integrated by an integrator and the integrated value is set at a predetermined value at a predetermined timing. Thus the absolute pressure value can be obtained on the basis of an output from the integrator.

The cylinder pressure detecting apparatus according to the invention further comprises a comparator adapted to compare the output signal from the integrator with a predetermined reference level and a failure detecting circuit adapted to detect an output pulse from the comparator, thereby enabling the occurrence of any failure of the sensor to be detected.

DESCRIPTION OF THE PREFERRED EMBODIMENTS

Figure 5:
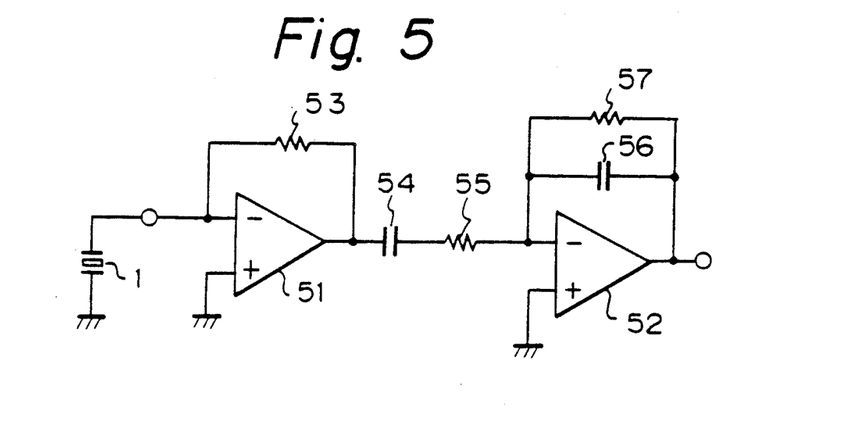
FIG. 5 is a circuit diagram showing an embodiment of the present invention.

FIG. 5 shows an embodiment of the present invention. In FIG. 5, reference numerals 51 and 52 denote operational amplifiers; 53, 55, and 57 indicate resistors; and 54 and 56 are capacitors. An output of the piezoelectric cylinder pressure sensor 1 is input to an inverting input terminal of the operational amplifier 51. The resistor 53 is connected between the inverting input terminal of the operational amplifier 51 and an output terminal thereof. The capacitor 54 and resistor 55 are connected in series between the output terminal of the operational amplifier 51 and an inverting input terminal of the operational amplifier 52. The resistor 57 and capacitor 56 are connected in parallel between the inverting input terminal of the operational amplifier 52 and an output terminal thereof. Non-inverting input terminals of the operational amplifiers 51 and 52 are connected to the ground.

The operation of the embodiment shown in FIG. 1 will now be described. When a charge value Q corresponding to the pressure in a cylinder is output from the sensor 1, a current of $-dQ/dt$ is output from the operational amplifier 51 and flows through the resistor 53 due to the feedback control of the operational amplifier 51. Now, assuming that a resistance value of the resistor 53 is set to $R_1$, an output voltage $V_1$ of the operational amplifier 51 can be expressed by the following equation due to a voltage drop brought about by the resistor 53.

$$V_1 = -R_1 \frac{dQ}{dt}$$

Figure 6:
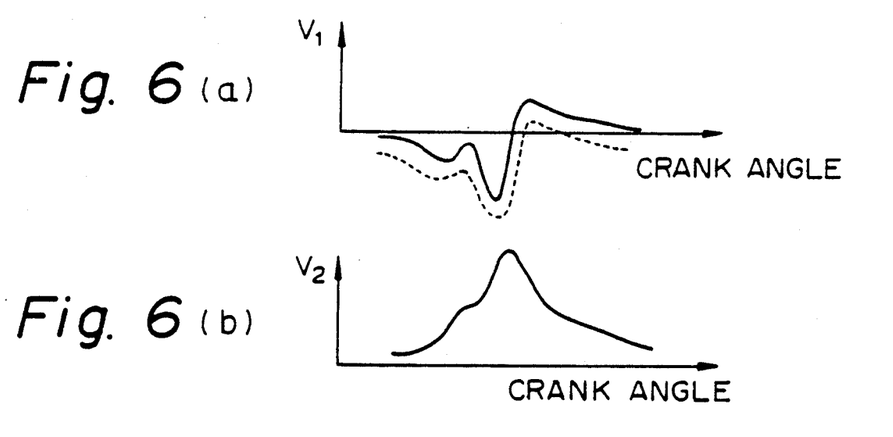
FIGS. 6(a) and 6(b) are explanatory diagrams of the embodiment shown in FIG. 5 during operation.

That is, the output current $dQ/dt$ of the sensor 1 is converted into the voltage value. In FIG. 6(a), a solid line indicates a signal waveform of the output voltage $V_1$ of the operational amplifier 51 which is based on the crank angle. The signal waveform corresponds to the result which is obtained by differentiating the cylinder pressure over a period of time.

An output current of the operational amplifier 51 is transferred through the capacitor 54 and resistor 55 to the inverting input terminal of the operational amplifier 52.

The electrostatic capacity of the capacitor 54 is set at a high enough value to be used for AC coupling. Thus the impedance of the capacitor is a fairly small value suitable for an appropriate current change ratio with respect to changes in cylinder pressure. Therefore, as shown by the following equation, the current $I_2$ flowing through the capacitor 54 is determined by the output voltage $V_1$ of the operational amplifier 51 and a resistance value $R_2$ of the resistor 55.

$$I_2 = \frac{V_1}{R_2} = -\frac{R_1}{R_2} \cdot \frac{dQ}{dt}$$

The current $I_2$ flows from the operational amplifier 52 by virtue of feedback control. The resistor 57 is provided to reset the output voltage $V_2$ of the operational amplifier 52 to zero. The resistance value $R_3$ of the resistor 57 is set at a high value so that the current obtained will be at a level that can be ignored in terms of the current flowing through the capacitor 56. Therefore, the output voltage $V_2$ of the operational amplifier 52 is determined by the output current $-I_2$ and the electrostatic capacity $C_2$ of the capacitor 56 as shown by the following equation.

$$V_2 = \frac{1}{C_2} \int -I_2 dt = \frac{1}{C_2} \int \left(\frac{R_1}{R_2} \cdot \frac{dQ}{dt}\right) dt = \frac{R_1}{C_2 R_2} \cdot Q$$

That is, the output voltage $V_2$ of the operational amplifier 52 is proportional to the output charge value Q of the sensor 1 and the associated output signal $V_2$ corresponds to the cylinder pressure as shown in FIG. 6(b).

In this manner, the cylinder pressure signal can be obtained by inputting the output signal of the piezoelectric cylinder pressure sensor as a current and by integrating the signal corresponding to the input current.

On the other hand, if a stationary leakage current $I_L$ were generated on the output line of the sensor 1, the output voltage $V_1$ of the operational amplifier could be represented as follows;

$$V_1 = -R_1 \left(\frac{dQ}{dt} + I_L\right)$$

and the associated output signal waveform is shown by a broken line in FIG. 6(a). However, since the electrostatic capacity $C_2$ of the capacitor 56 can be set at a relatively large value, the influence caused by the input leakage current of the operational amplifier 52 is reduced. Further, since the input signal of the integrator including the operational amplifier 52 in the next stage is coupled through the capacitor 54 in an AC manner to the output of the amplifier 51, the amount of change $-R_1 I_L$ caused by the leakage current is blocked by the capacitor 54 and only the signal component $$-R_1 \frac{dQ}{dt}$$

brought about by the change in cylinder pressure is integrated.

Consequently, the waveform of the output of the integrator, i.e., the operational amplifier 52, becomes a stable cylinder pressure waveform as shown in FIG. 6(b), irrespective of the presence or absence of leakage current.

In the embodiment described above, the current-/voltage converting circuit is used as the current input circuit by using the operational amplifier 51. However, a current amplifying circuit which receives a current and outputs a current can also be used. In such a case, a resistor 55 is not provided in the integrator including the operational amplifier 52, and it is sufficient to directly integrate the output current by means of integrator.

Additionally, although an AC coupling capacitor is only interposed between the current input circuit and the integrator in the above-described embodiment, it is also possible to dispose one between the current input circuit and the piezoelectric cylinder pressure sensor 1.

Figure 7:
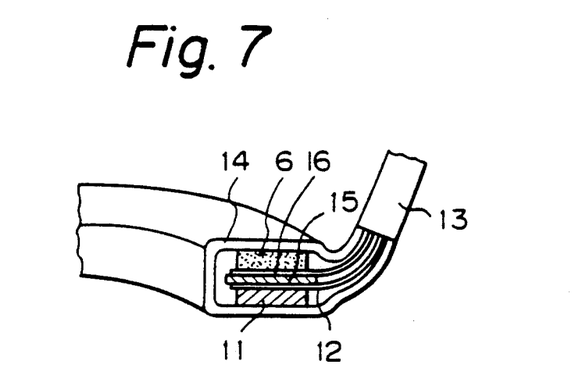
FIGS. 7 and 8 are cross-sectional views each showing a piezoelectric cylinder pressure sensor incorporating a thermistor for temperature compensation.
Figure 9:
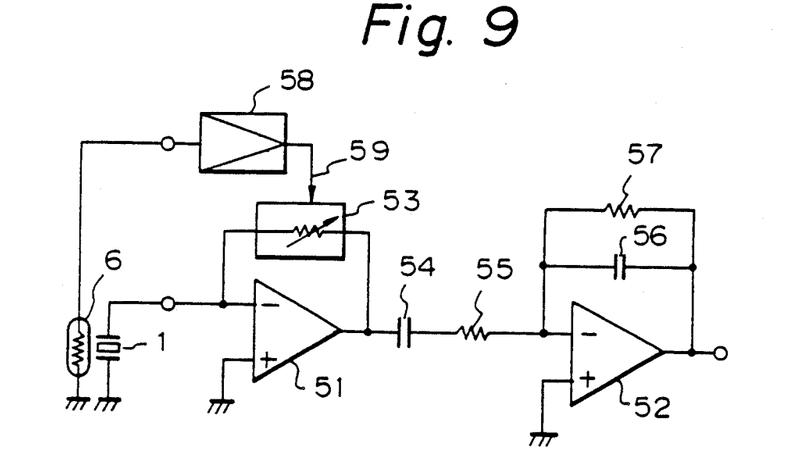
FIGS. 9 and 10 are circuit diagrams showing second and third embodiments of the invention in which a temperature compensating function is added by using the sensors shown in FIGS. 7 and 8, respectively.

Next, the means for compensating for temperature changes in this invention will be described. The pressure/charge amount conversion coefficient of the piezoelectric cylinder pressure sensor 1 has a positive temperature characteristic. When temperature rises, the output charge also rises. Therefore, the output signal of the operational amplifier 51 increases as shown by the broken line in FIG. 11(a). To accurately obtain cylinder pressure, it is necessary to perform an adjustment to allow for the change in temperature of the sensor 1. In this embodiment, therefore, a thermistor 6 is provided in the sensor 1, as shown in FIG. 7. In FIG. 7, an electrode 16 and an insulative plate 15 are provided in the sensor shown in FIG. 1 in addition to the thermistor 6. The amount of any temperature change is detected from the change in resistance of the thermistor 6. As shown in FIG. 9, an amplifier 58 is connected to the thermistor 6 and the change in resistance of the thermistor 6 is thereby converted into a change in voltage. The resistor 53 for feedback of the operational amplifier 51 changes the resistance value in accordance with the voltage output of the amplifier 58 so that the resistance value of the resistor 53 decreases as the voltage output from the amplifier 58 increase. Therefore, even if the level of the voltage output from the operational amplifier 51 tends to increase as shown by the broken line in FIG. 11(a), due to an increase in the output charge caused by the increase in temperature of the sensor 1, the resistance value of the resistor 53 is reduced because of the change in resistance of the thermistor 6. Thus, despite the change in temperature of the sensor 1, a signal as shown by the solid line in FIG. 11(a) can be obtained and a cylinder pressure signal which is consistently stable can be derived as shown in FIG. 11(b).

Figure 8:
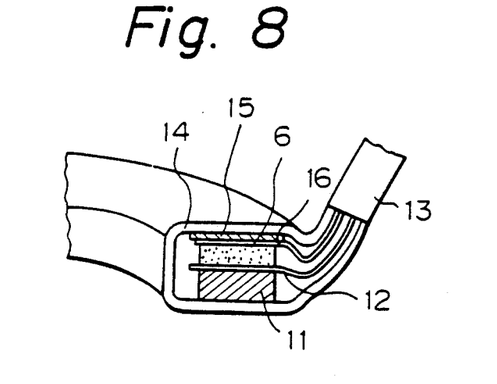
Figure 10:
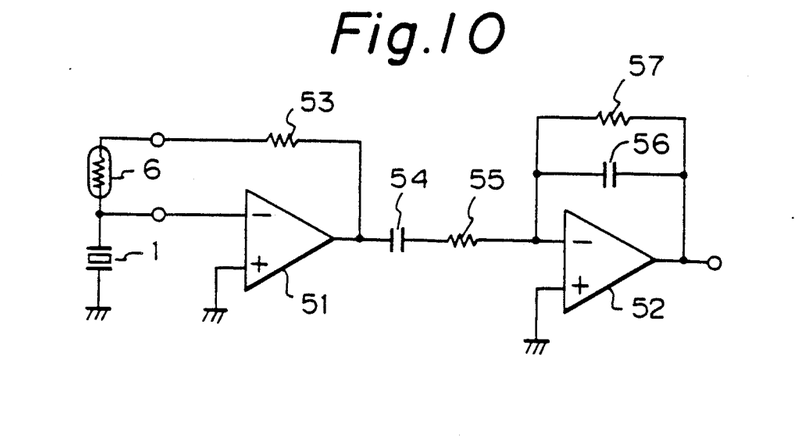

Further, it is also possible to provide an arrangement in which the thermistor 6, insulative plate 15 and electrode 16 are assembled in the sensor 1 in the manner shown in FIG. 8. In this case, the thermistor 6 itself functions as a part of the feedback resistor of the operational amplifier 51, as shown in FIG. 10. In such a case, the thermistor 6 is constructed as a part of a current-/voltage converting element and any change in resistance caused by a change in the temperature of the thermistor 6 immediately changes the current/voltage conversion coefficient.

Figure 11:
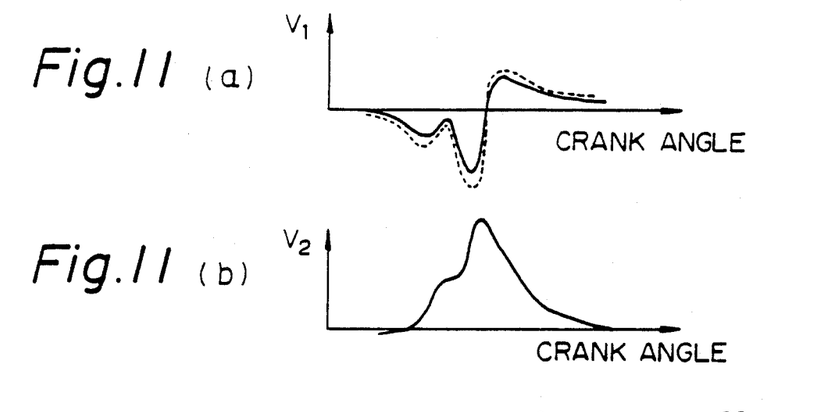
FIGS. 11(a) and 11(b) are explanatory diagrams of the embodiments shown in FIGS. 9 and 10 during operation.

Therefore, even in the arrangement shown in FIG. 10, if the output signal of the operational amplifier 51 tends to increase, as shown by the broken line in FIG. 11(a), due to an increase in output charge caused by the increase in temperature of the sensor 1, the sum of the resistance values of the resistor 53 and thermistor 6 is reduced due to the change in resistance of the thermistor 6. Thus, in spite of the change in temperature of the sensor 1, the signal shown by the solid line in FIG. 11(a) can be obtained and a cylinder pressure signal which is consistently stable can be derived therefrom as shown in FIG. 11(b).

In the second and third embodiments shown in FIGS. 7 to 10, the thermistor is used as a temperature measuring device. However, other devices such as a semiconductor, thermocouple element, or the like can also be used. Additionally, the temperature detecting device can be arranged adjacent to the cylinder pressure sensor; the position in the sensor is not critical.

Figure 12:
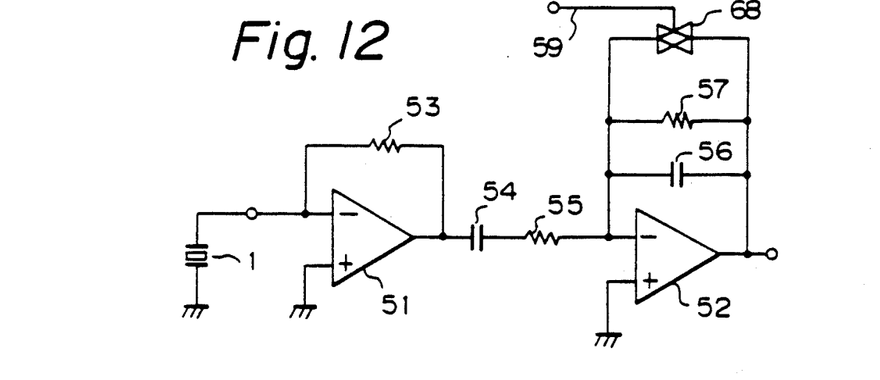
FIG. 12 is a circuit diagram showing a fourth embodiment of the invention in which a function of indicating the absolute value of pressure in a cylinder is incorporated.
Figure 13:
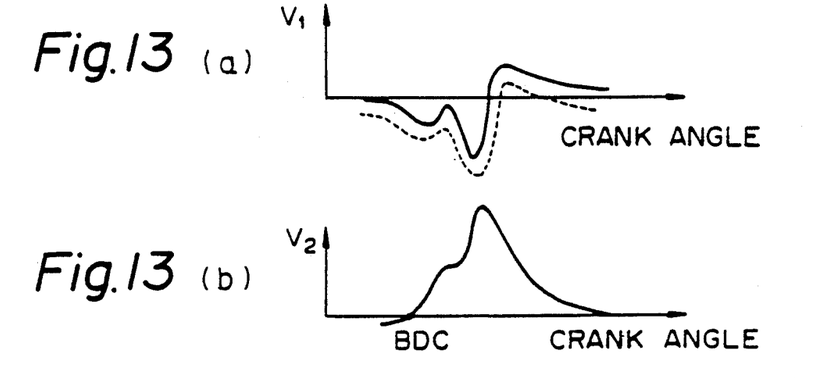
FIGS. 13(a) and 13(b) are explanatory diagrams of the embodiment shown in FIG. 12 during operation.

A fourth embodiment of the invention will now be described with reference to FIGS. 12 and 13. The output waveform of the operational amplifier 52 shows a change in cylinder pressure and does not show the absolute value of the cylinder pressure. Therefore, in the embodiment indicated in FIG. 12, an analog switch 68 is connected in parallel with the integrating capacitor 56 and an integrated value (charge voltage of the capacitor 56) can be reset to zero by turning on the analog switch 68 at a predetermined timing. The absolute value of the cylinder pressure at the predetermined timing may be measured by any method and the change value of the output of the operational amplifier 52 after resetting is added to the absolute value at the predetermined timing and an absolute value of the cylinder pressure at any given timing after resetting can be obtained as the summed value. As a practical method for use in such a case, when, for instance, the piston of the cylinder whose pressure is to be measured is located at bottom dead center (hereinafter, abbreviated as BDC) in the air intake step, the pressure value in the intake air pipe is measured, the pressure value is set to the cylinder pressure absolute value at the intake BDC, and the integrated value is reset to zero at that timing. This is because the intake air valve is open at the intake BDC and the pressures in the cylinder and the intake air pipe are equalized. To realize the above method, which is arithmetically operated by using an output signal from a crank angle sensor attached to the cam shaft of the engine or the like, a pulse signal is input to a control input terminal 59 of the analog gate 68 at the timing of the intake BDC. On the other hand, to measure the pressure in the intake air pipe, a pressure sensor for converting the pressure value into an electrical signal can be used. According to the above method, the output signal waveform of the operational amplifier 52 is set to zero at the intake BDC as shown in FIG. 13(b), and a change in cylinder pressure is shown by using that point as a reference. Hence, the absolute value of the cylinder pressure can be represented by the sum of the pressure value of the pressure sensor and the pressure value based on the output signal of the operational amplifier 52.

In this embodiment, the integrated value is reset at the timing of the intake BDC. However, it can also be reset to another timing in the period during which the intake valve is open.

Although the integrated value is set to zero in this embodiment, it can alternatively be set to a value corresponding to the pressure value of the pressure sensor, and the absolute pressure value can also be directly obtained from the output value of the operational amplifier 52. In such a case, the voltage corresponding to the pressure value of the pressure sensor is output from the power source and is transmitted to the capacitor 56 through an analog switch, whereby immediate charging of the capacitor 56 is executed.

Figure 14:
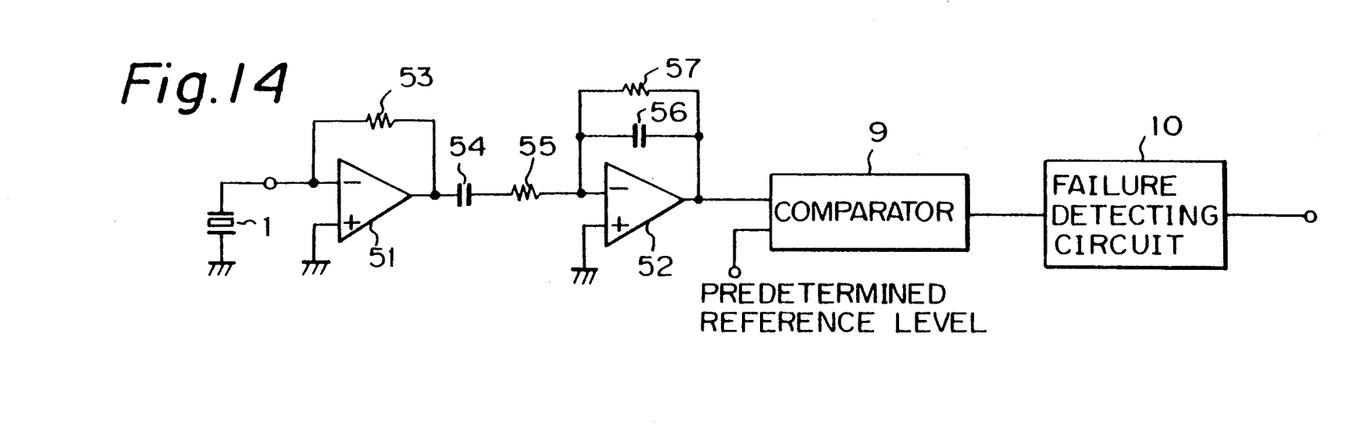
FIG. 14 is a circuit diagram showing a fifth embodiment of the invention in which a function of detecting any failure of a cylinder pressure sensor is incorporated.

FIG. 14 shows a fifth embodiment of the invention in which means for detecting any failure of the cylinder pressure sensor is added. In FIG. 14, reference numeral 9 denotes a comparator connected to the second operational amplifier 52 and 10 indicates a failure detecting circuit connected to the comparator 9, although the diagram shows a construction in which the failure detecting means is added to the embodiment shown in FIG. 5, the failure detecting means can obviously be added to any of the embodiments shown in FIGS. 9, 10, and 12.

Figure 15:
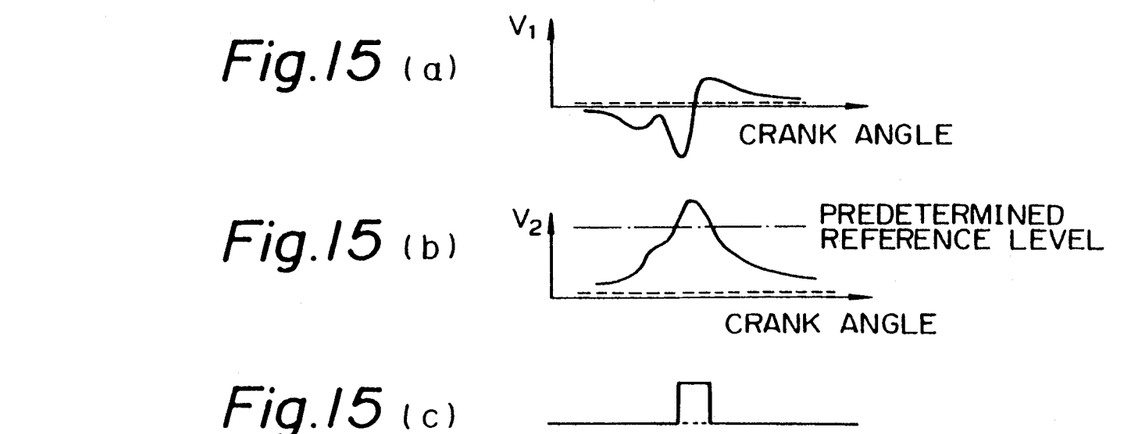
FIGS. 15(a), 15(b) and 15(c) are explanatory diagram of the embodiment shown in FIG. 14 during operation.

The signal waveform $V_2$ shown in FIG. 15(b) is applied to the comparator 9 and is compared with a predetermined reference level. When the piezoelectric cylinder pressure sensor 1 normally operates as shown by a solid line in FIG. 15(a) and the signal $V_2$ is output as shown by solid line in FIG. 15(b), the comparator 9 generates an output pulse as shown in FIG. 15(c). However, when the sensor 1 fails as shown by the broken line in FIG. 15(a) and the voltage $V_2$ as shown by the broken line in FIG. 15(b) is output, no output pulse is generated by the comparator 9. The presence or absence of the output pulse is detected by the failure detecting circuit 10, thereby determining whether the sensor 1 has failed or not and the result of the determination as to the presence or absence of any failure is displayed by display means (not shown).

It will be further understood by those skilled in the art that the foregoing description is of preferred embodiments of the disclosed device and that various changes and modifications may be made to these embodiments of the invention without departing from the spirit and scope thereof.

What is claimed is:

1. An apparatus for detecting pressure in a cylinder of an internal combustion engine, comprising:
   a piezoelectric pressure sensor for detecting pressure in the combustion cylinder of said internal combustion engine and for outputting an electrical output signal according to the pressure;
   a current input circuit for directly receiving said electrical signal output from said sensor in the form of a current and for generating an output corresponding to the value of the current, wherein said current input circuit consists of an operational amplifier and resistory means connected between input and output terminals of said operational amplifier for converting said current signal output from said sensor to a voltage signal; and wherein said current input circuit outputs said voltage signal which is proportional to dP/dt, where P is said detected pressure.

2. An apparatus according to claim 1, further comprising an integrator for integrating signals output from said current input circuit.

3. An apparatus according to claim 2, further comprising setting means for setting an output value of said integrator to a predetermined level at a predetermined time in order to obtain signal representing the absolute value of the pressure.

4. An apparatus according to claim 3, wherein said setting means is a switch adapted to reset said integrator.

5. An apparatus according to claim 2, further comprising a comparator adapted to compare an output signal from said integrator with a predetermined reference level and a failure detecting circuit adapted to detect an output pulse from said comparator,
   and wherein when the failure detecting circuit detects no output pulse from the comparator, it is determined that the piezoelectric pressure sensor has failed.

6. An apparatus according to claim 2, wherein the signals output from said current input circuit are input to said integrator through a coupling capacitor.

7. An apparatus according to claim 1, further comprising:
  temperature detecting means for detecting the temperature of said piezoelectric pressure sensor; and
  temperature correcting means for correcting the output of said current input circuit in accordance with an output of said temperature detecting means.

8. An apparatus according to claim 7, wherein said temperature detecting means and said temperature correcting means comprise a thermistor which is thermally coupled with said sensor and is connected with said resistor means between said input and output terminals of said operational amplifier, thereby enabling the output of said current input circuit to be temperature corrected.

9. An apparatus according to claim 7, wherein said resistor between said input and output terminals of said amplifier consists of variable resistor means which is electronically controlled and is constructed so as to variably control a resistance value of said variable resistor means in accordance with the output of said temperature detecting means, thereby enabling the output of said current input circuit to be temperature corrected.

* * * * *